US012283119B2

(12) United States Patent
Vineet et al.

(10) Patent No.: US 12,283,119 B2
(45) Date of Patent: Apr. 22, 2025

(54) 3D OBJECT DETECTION

(71) Applicant: Five AI Limited, Bristol (GB)

(72) Inventors: Vibhav Vineet, Cambridge (GB); John Redford, Cambridge (GB)

(73) Assignee: Five AI Limited, Cambridge (GB)

( * ) Notice: Subject to any disclaimer, the term of this patent is extended or adjusted under 35 U.S.C. 154(b) by 321 days.

(21) Appl. No.: 17/775,944

(22) PCT Filed: Nov. 11, 2020

(86) PCT No.: PCT/EP2020/081799
§ 371 (c)(1),
(2) Date: May 11, 2022

(87) PCT Pub. No.: WO2021/094398
PCT Pub. Date: May 20, 2021

(65) Prior Publication Data
US 2022/0383648 A1     Dec. 1, 2022

(30) Foreign Application Priority Data
Nov. 11, 2019    (GB) ...................................... 1916371

(51) Int. Cl.
| | |
|---|---|
| *G06V 20/64* | (2022.01) |
| *G06V 10/25* | (2022.01) |
| *G06V 10/62* | (2022.01) |
| *G06V 10/776* | (2022.01) |
| *G06V 10/82* | (2022.01) |
| *G06V 20/58* | (2022.01) |

(52) U.S. Cl.
CPC ............ *G06V 20/647* (2022.01); *G06V 10/25* (2022.01); *G06V 10/776* (2022.01); *G06V 10/82* (2022.01); *G06V 20/58* (2022.01); *G06V 20/64* (2022.01); *G06V 10/62* (2022.01)

(58) Field of Classification Search
USPC .......................................................... 382/103
See application file for complete search history.

(56) References Cited

U.S. PATENT DOCUMENTS

| | | | |
|---|---|---|---|
| 2018/0061058 A1* | 3/2018 | Xu ......................... | G06N 3/084 |
| 2019/0145765 A1* | 5/2019 | Luo ...................... | G06V 10/764 |
| | | | 702/153 |

OTHER PUBLICATIONS

Title: Shuffle and Learn: Unsupervised Learning Using Temporal Order Verification by: Misra et al. Date: Jul. 26, 2019.

(Continued)

*Primary Examiner* — Darryl V Dottin
(74) *Attorney, Agent, or Firm* — Andrew J. Tibbetts; Samuel S. Stone; Greenberg Traurig, LLP

(57) ABSTRACT

A method of training a 3D structure detector to detect 3D structure in 3D structure representation, the method comprising the following steps: receiving, at a trainable 3D structure detector, a set of training inputs, each training input comprising at least one 3D structure representation; the 3D structure detector determining, for each training input, a set of predicted 3D objects for the at least one 3D structure representation of that training input; and training the 3D structure detector to optimize a cost function, wherein the cost function penalizes deviation from an expected geometric relationship between the set of predicted 3D objects determined for each training in put.

20 Claims, 5 Drawing Sheets

(56) References Cited

OTHER PUBLICATIONS

Title: Fast and Furious: Real Time End-to-End 3D Detection, tracking and motion forecasting with a single convolutional Net by: Luo et al. Date: 2018.
Title: PIXOR: Real-time 3D object detection from point clouds by: Yang et al. Date: 2018.
International Search Report and Written Opinion mailed Feb. 24, 2021 in corresponding International PCT Patent Application No. PCT/EP2020/080938 (11 pages).
Shaoshuai Shi et al., "Part-A2 Net: 3D Part-Aware and Aggregation Neural Network for Object Detection from Point Cloud", arxiv.org, Cornell University Library, 201 Olin Library Cornell University Ithaca, NY 14853,Jul. 8, 2019.
Tang Yew Siang et al., "Transferable Semi-Supervised 3D Object Detection From RGB-D Data", 2019 IEEE/CVF International Conference on Computer Vision (ICCV), IEEE,Oct. 27, 2019 (Oct. 27, 2019), p. 1931-1940.

\* cited by examiner

3D OBJECT DETECTION

CROSS-REFERENCE TO RELATED APPLICATIONS

This application is the U.S. National Stage application, pursuant to 35 U.S.C. § 371, of PCT International Patent Application No. PCT/EP2020/081799, filed Nov. 11, 2020, designating the United States and published in English, which claims priority under 35 U.S.C. §§ 119 and 365 to Great Britain Patent Application No. 1916371.6, filed Nov. 11, 2019. The contents of each of the aforementioned applications are incorporated herein by reference in their entirety.

TECHNICAL FIELD

This disclosure relates to three-dimensional (3D) object detection.

BACKGROUND

In recent years, machine learning (ML) models have proved highly effective at performing various image processing tasks. A ML model means a computer program or set of computer programs that has or have learned to perform a desired task from a set of training data, rather than being explicitly programed to perform that task. Typically an ML model has a set of cooperating model parameters (such as weights) in a defined model architecture, and is configured to process each received input according to those model parameters in order to determine a corresponding output. During training, the model parameters are tuned systematically based on the training data until the model is able to perform the desired task with sufficient accuracy. A successful ML model is able, once trained, to generalize its learning to inputs it has not encountered during training.

In supervised ML, a model is trained using labelled (annotated) training inputs. In a typical training phase, the model parameters are systematically tuned with the objective of optimizing a cost function (or objective function) that provides a measure of difference between "ground truth" labels assigned to the training inputs and the corresponding outputs of the model as determined by processing the training inputs according to the model parameters (the cost or error). A commonly used training process is stochastic gradient descent (SGD), which is an iterative process for optimizing a cost function that is differentiable with respect to the model parameters. With convolutional neural networks (CNNs) and other neural networks, SDC is often used in conjunction with a backpropagation algorithm to calculate the required gradients with respect to the weights in the network.

CNNs are one example of a class of ML models which have proved adept at many image processing tasks. CNNs may be used to extract higher and higher level representations of image content, through the application of successive convolutions over multidimensional dimensional feature spaces, which allows them to perform highly sophisticated image interpretation tasks. Whilst CNNs are able to achieve exceptional accuracy on such tasks, very large sets of training data may be required to achieve this.

Examples of image processing task include semantic image classification (classifying an image in relation to a set of semantic classes according to its visual content), semantic image segmentation (per-pixel semantic classification) and structure detection (detecting objects and other structure in images, e.g. by predicting bounding boxes or other bounding structures). Such image processing tasks have many practical applications, two examples being autonomous driving and robotics (among many others).

One example in particular is 2D (two-dimensional) object detection. This is often formulated as the problem of determining 2D bounding boxes around detected structure in 2D images, such as RGB (Red Green Blue) images. State of the art ML models such as CNNs are able to now able to perform 2D bounding box detection with exceptional accuracy in almost any practical context.

Another image interpretation task that is inherently suitable for performance by state of the art ML models such as CNNs is 3D object detection. That is, determining 3D bounding boxes (or other 3D boundary objects) around structure detected in 3D images, such as RGBD images (Red Green Blue Depth). However, a problem encountered in this context is the need for large amounts of 3D annotation data. Annotating 2D images with ground truth 2D bounding boxes for 2D object detection is a relatively straightforward task, as in essence it is simply a case of drawing a 2D box around the relevant object/structure in the image. However, annotating 3D images with accurate 3D ground truth bounding boxes is a much more burdensome task for a human to perform, as each 3D bounding box needs to be accurately located, orientated and sized in 3D dimensions.

SUMMARY

The present disclosure provides various methods by which a 3D structure detector, such as a CNN, can be trained to perform 3D object detection with state of the art or near state of the art accuracy, but using significantly fewer 3D-annotated training inputs. The present techniques can be applied to 3D images but, more generally, to any form of 3D structure representation, such as point clouds, voxel structures etc.

In a first aspect, the present invention exploits expected geometric relationships between predicted 3D boundary objects (e.g. 3D bounding boxes) to reduce the amount of 3D annotation that is required.

In a second aspect, the present invention makes use of 2D annotation data to reduce the amount of 3D annotation data that is required.

According to the first aspect, a method of training a 3D structure detector to detect 3D structure in 3D structure representation, the method comprises the following steps: receiving, at a trainable 3D structure detector, a set of training inputs, each training input comprising at least one 3D structure representation; the 3D structure detector determining, for each training input, a set of predicted 3D objects for the at least one 3D structure representation of that training input; and training the 3D structure detector to optimize a cost function, wherein the cost function penalizes deviation from an expected geometric relationship between the set of predicted 3D objects determined for each training input.

Note that the terms object and structural element are used interchangeably herein to mean any identifiable piece of 3D structure. The terms "predicted 3D object" and "detected 3D object" are used synonymously to refer to the outputs of the 3D structure detector.

In certain embodiments, each training input may comprise at least two 3D structure representations, wherein the set of predicted 3D objects are predicted 3D objects for a common 3D structural element captured in the 3D structure representations of that training input.

That is, the predicted 3D objects may correspond to the same (common) structural component, e.g. at different times or captured from different sensor angles/locations.

Examples of such expected geometric relationships that can be exploited include the following. The following examples refer to 3D images but the teaching applies equally to other forms of 3D structure representation.

A predicted 3D object may be represented as one or more of: a 3D location/position, a 3D orientation/pose, and a size (extend in 3D space). A 3D bounding box or other 3D boundary object may encode all three (position, orientation and size).

Size: it may for example be assumed that the common 3D structural element (object) has a fixed size (height, width and/or depth), in which case the cost function may penalize any differences in the respective sizes of the predicted 3D objects determined for a given training input (that is, for a given training input, the height, width and/or depth of each predicted 3D object should match). In this case, as a minimum, the 3D structure detector predicts 3D object size.

Position/orientation: where the differences in the 3D position and/or 3D orientation of the object across the 3D images of a training input are known, then the predicted 3D objects should exhibit matching differences in their respective positions and/or orientations. In that case, case the cost function can penalize deviations from the known differences. In this case, the 3D structure detector, as a minimum, predicts one or both of 3D object location and 3D object orientation.

The 3D images of a given training input can for example be images in a temporal sequence of images as captured by an image capture device. This could for example be an image capture device of a travelling vehicle that captures a sequence of 3D images of the vehicle's surroundings as it travels (e.g. a view in front of or behind the vehicle). An object tracker may be used to track changes in the position and/or orientation of the common object over time in 3D space. In this case, any differences in the position and/or orientation of the predicted 3D objects as determined for a given training input should match the corresponding changes in position and/or orientation of the common object as determined by the object tracker. In that case, the cost function may penalize deviations from the differences in position and/or orientation as determined using the object tracker.

As another example, the 3D images in a given training input may be images that were captured simultaneously by different image capture units (such as a stereoscopic pair of image capture units) having a certain geometric relationship to each other (e.g. located a fixed distance apart). In this case, the expected differences in the position and/or orientation of the predicted 3D objects are determined by the geometric relationship between the image capture units, and the cost function may in that case penalize deviations from those expected differences.

The above examples exploit known relationships that occur when a particular object (the common structure component) is captured at different times or from different sensors.

However, the present disclosure is not limited in this respect. As another example, the set of predicted 3D objects are predicted 3D objects for component parts of a 3D object captured in the at least one 3D structure representation, the cost function penalizing deviation from an expected geometric relationship between the component parts.

For example, the cost penalty could exploit known geometric relationships between vehicle components (e.g. the relative location/orientation of the vehicle's wheels, different parts of the vehicle's body etc.), body parts of a human or animal, or for objects such as cyclists or motorcyclists made up of a rider and a vehicle, relationships between the rider and the vehicle.

Expected relationships between component part may be defined in terms of relative position, relative orientation and/or relative size of the predicted 3D objects. For example, if the component parts are front or back wheels of a car, the cost function could penalize relative orientation differences between the predicted front or back wheel objects; or, in the case of a cyclist, the cost function could apply a penalty if a predicted human object (component part) is separated from a precited vehicle object (component part) by an unexpectedly high distance, or if the human component is below or to the side of the vehicle component.

Note, this exploits information about known relationships between components parts, or known relationships between instances of the same object at different times or from different sensor units. This is different from conventional training, where the cost function simply penalizes differences between a predicted 3D object and some ground truth information (sometimes referred to as an annotation or label), but does not take into account information about how those predicted 3D objects are expected to relate to each other. Simply penalizing a deviation between the predicted 3D object and a corresponding ground truth/annotation/label only considers that object in isolation, and does not take into account any information about how that predicted 3D object is expected to relate to any other predicted 3D object.

A significant benefit of the present techniques is that they can be applied to unlabelled training training data or only partially labelled training data—e.g., in the above examples, the common structural component or the component parts are not required to be annoted in the 3D structure representations (or they may be only partially annotated).

The expected geometric relationship could be manually encoded in the cost function, or it could be learned though some structured training process. Either way, the cost function incorporates "external" knowledge into the cost function of the expected geometric relationship between the predicted 3D objects, i.e. knowledge of their expected relative geometric arrangement (e.g. relative position, relative size and/or relative orientation), that goes beyond any ground truth (to the extent this is provided) that only considered each object in isolation.

In embodiments, least some of the 3D structure representations may be selected from at least one temporal sequence of structure representations.

In that case, the predicted 3D objects may correspond to a common structural component 3D structural element at different times (i.e. the same physical object but at different times).

For example, object tracking may be applied, by an object tracker, to the at least one temporal sequence of structure representations, wherein the expected geometric relationship may be determined for each of said at least some of the training inputs based on tracking of the common 3D structural element by the object tracker.

The at least one temporal sequence of structure representations may, for example, be a sequence of images comprised in at least one video image.

At least one of the training inputs may comprise at least two 3D structure representations captured by different sensor units, and the expected geometric relationship between the predicted 3D objects may be determined based on a known geometric relationship between the different sensor units.

In that case, the predicted 3D objects may correspond to the common as structural component captured from the different sensor units (i.e. the same physical object but sensed by different sensor units).

The known geometric relationship may, for example, be determined by processing data captured by the different sensor units.

In any of the above, the method may comprise a step of determining, for each of at least some of the training inputs, a size difference between the set of predicted 3D objects, wherein the cost function may penalize any deviation in the determined size difference from an expected size difference for each of those training inputs.

For example, in the case of a common structural component, the expected size difference may be zero. This assumed the size of common structural component remains constant.

The method may, alternatively or additionally, comprise a step of determining, for each of at least some of the training inputs, a position difference between the set of predicted 3D objects, wherein the cost function may penalize any deviation in the determined position difference from an expected position difference.

The expected position difference may, for example, be determined based on the tracking of the common 3D structural element by the above object tracker.

Alternatively or additionally, the method may comprise a step of determining, for each of at least some of the training inputs, an orientation difference between the set of predicted 3D objects, wherein the cost function may penalize any deviation in the determined orientation difference from an expected orientation difference.

For example, the expected orientation difference may be determined based on the tracking of the common 3D structural element by the object tracker.

In the case that the predicted 3D objects correspond to component parts, the cost function may penalize any deviation in the determined size, position or orientation difference from an expected size, position or orientation difference between the component parts. That is, the cost function may penalize a relative size, relative position and/or relative orientation between the predicted 3D objects that deviated from an expected relative size, relative position and/or relative orientation.

In the case of component parts, the captured 3D object may, for example, comprise a vehicle and the component parts may comprise vehicle components. Alternatively or additionally, the captured 3D object comp may comprise rises a living being, and the component parts may comprise body parts. For example, the captured 3D object may comprise both a living being and a vehicle, and the component parts may comprise one or more body parts and one or more vehicle components.

A subset of the 3D structure representations may have associated ground truth 3D object annotation data, and the cost function may also penalize deviations between the ground truth 3D object annotation data and the predicted 3D objects determined for those 3D structure representations by the 3D object detector.

Each 3D object may be represented as a 3D boundary object.

The 3D boundary objects may, for example, be 3D bounding boxes, which may or may not be amodal.

At least some 3D structure representations received at the 3D structure detector may have associated 2D structure annotation data, and the cost function may also penalize deviation between a predicted 2D boundary object determined for each of those 3D structure representations and the associated 2D structure annotation data. The predicted 2D boundary object may be determined by projecting the predicted 3D boundary object determined for that 3D structure representations into a 2D image plane.

In accordance with the second aspect mentioned above, a method of training a 3D structure detector to detect 3D structure in 3D structure representations comprises the following steps: receiving, at a trainable 3D structure detector, training inputs comprising 3D structure representations; the 3D structure detector determining, for each training 3D structure representation, a predicted 3D boundary object for a 3D structural element detected in that training 3D structure representation; determining for each 3D structure representation a predicted 2D boundary object, by projecting the predicted 3D boundary object into a 2D image plane; and training the 3D structure detector to optimize a cost function, wherein each 3D structure representation has associated 2D structure annotation data for marking 2D structure in the 2D image plane, and the cost function penalizes deviation between the predicted 2D boundary object and the 2D structure annotation data.

At least some of the 2D structure annotation data may be manually determined.

At least some of the 2D structure annotation data may be determined automatically by applying 2D object detection to 2D image data of or derived from the 3D structure representations.

The predicted 3D boundary object may be a 3D bounding box, and the 2D annotation data may define a ground truth 2D bounding box in the image plane for each 3D structure representation.

The predicted 2D boundary object may be a predicted 2D bounding box determined by projecting the corners points of the 3D bounding box into the image plane, and determining therefrom at least two corner points for the predicted 2D bounding box. The cost function may penalize differences in the distance between those corner points and corresponding corner points of the ground truth 2D bounding box.

According to a further aspect of the invention, a method of training a 3D structure detector to detect 3D structure in 3D images comprises the following steps: receiving, at a trainable 3D structure detector, a set of training inputs, each training input comprising at least two 3D images; the 3D structure detector determining, for each training input, a set of predicted 3D boundary objects for a common 3D structural element detected in the 3D images of that training input; and training the 3D structure detector to optimize a cost function, wherein the cost function penalizes deviation from an expected geometric relationship between the set of predicted 3D boundary objects determined for each training input.

Further aspects herein provide executable 3D object detector which is embodied in a computer readable storage medium and which has been trained in accordance with any of the training methods taught herein, and processing system comprising execution hardware configured to execute the 3D object detector in order to detect 3D structure in received 3D structure representations.

A further aspect provides an autonomous vehicle comprising: at least one 3D sensor; a processing system as above, coupled to the 3D sensor device for detecting 3D structure in 3D structure representations captured thereby;

and a control system configured to control the operation of the autonomous vehicle based on 3D structure detected by the processing system.

According to a further aspect of the invention, a method of training a 3D structure detector to detect 3D structure in 3D images comprises the following steps: receiving 3D training images at a trainable 3D structure detector; the 3D structure detector determining, for each 3D training image, a predicted 3D boundary object for a 3D structural element detected in that 3D image; determining for each 3D training image a predicted 2D boundary object, by projecting the predicted 3D boundary object into a 2D image plane of the 3D image; and training the 3D structure detector to optimize a cost function, wherein each 3D training image has associated 2D structure annotation data for marking 2D structure in the 2D image plane, and the cost function penalizes deviation between the predicted 2D boundary object and the 2D structure annotation data.

A further aspect herein provides a computer program product for programming one or more computers to carry out any of the methods or functions taught herein.

BRIEF DESCRIPTION OF FIGURES

For a better understanding of the present invention, and to show how embodiments of the same may be carried into effect, reference is made by way of example only to the following figures in which.

DETAILED DESCRIPTION

In the described embodiments of the invention, a 3D structure detector, implemented as a CNN or other ML model, is trained to perform object detection based on certain training constraints.

A natural representation for autonomous vehicles (AVs) and robots operating in the physical world is a three dimensional (3D) space. In 3D space an object can be represented by a 3D position vector, a 3D orientation vector (which combine to give a 6D pose) and a size (spatial extent). Size can be represented as a height, length and depth of a 3D bounding box around the object.

However, whilst the performance of modern computer vision models for 2D scene understanding, either formulated as 2D bounding box detection or 2D semantic segmentation, has increased at an unprecedented pace over the past few years, such techniques provide minimal information about an object's 6D pose and spatial extent. Such information is essential for applications such as autonomous driving, manipulation, activity forecasting and other robotics tasks. For this reason, the described embodiments provide 3D object detection which predicts an oriented three dimensional (3D) bounding box tightly enclosing each object rather that its 2D counterpart.

In contrast to 2D bounding box detection, which is nowadays mature enough for almost any arbitrarily challenging application, 3D object detection remains a challenging problem. As noted, a particular challenge is the need for 3D-annotated training data, i.e. 3D images annotated with ground truth 3D bounding boxes.

The techniques disclosed herein solve this problem by introducing various structural and geometrical constraints in training, in order to allow a 3D object detector to be trained using only a relatively small number of 3D-annotated images.

Deep learning is powerful feature representation framework but do not explicitly enforce such geometric/structured constrains. Hence the constraints are built into the cost function that is optimized in training.

Introducing these constraints in training means that the model can be trained to achieve the required level of accuracy using a comparatively small number of 3D-annotated training RGBD images. By way of illustration, acceptable accuracy with a CNN will generally require a training set of tens or hundreds of thousands 3D images. However, when the above constraints are applied in training, this accuracy can be achieved even when only a few hundred of those images have been annotated with ground truth 3D bounding boxes. The rest of the images in the training set can be unannotated (that is, not annotated by humans because the required training labels can be derived automatically) or annotated in a much simpler fashion as explained below. As will be appreciated, this is an extremely significant saving in terms of required annotation resources.

Figure 1:
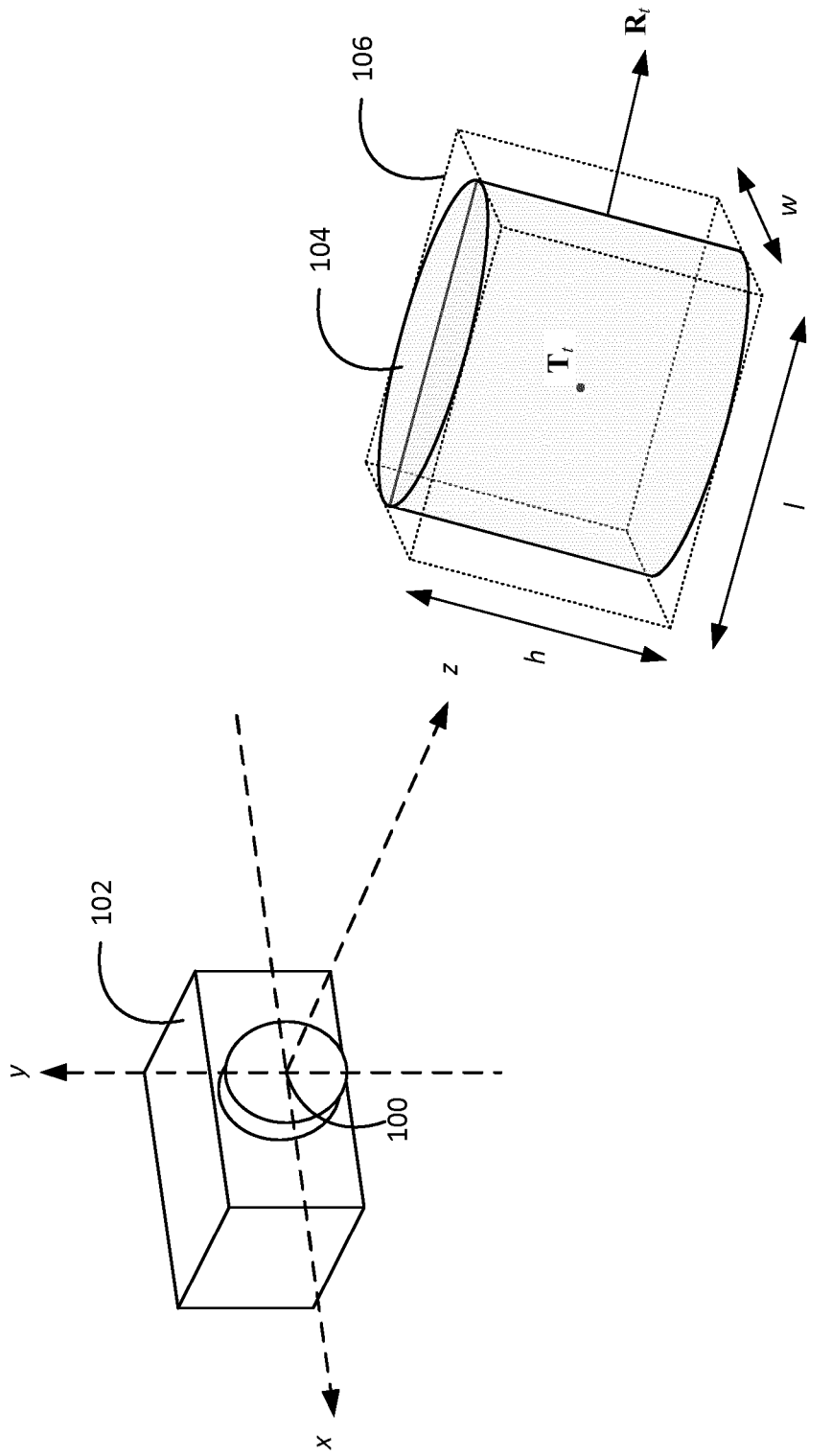
FIG. 1 shows a perspective view of an object and an image capture device in a real-world space.

With reference to FIG. 1, the problem is formulated in a reference frame having an origin 100 at an image capture device 102 (camera), with the z-direction along the camera's optical axis into the field-of-view, x towards right along the horizontal when viewed from the camera 102, and y being orthogonal to x and z. This is referred to herein as the camera reference frame. Where the camera is mounted on a vehicle, this may also be referred to as the vehicle reference frame. Although not shown in FIG. 1, the image capture device 102 can be formed of multiple image capture units, such as stereoscopic pair of image capture units.

A 3D object 104 at time t is represented by its center position $T_t=(x,y,z) \in R^3$, orientation $R_t=(\theta,\varphi,\Psi) \in SO(3)$ and size $S_t=(l, h, w) \in R^3$. The center position $T_t$ and orientation $R_t$ of the object are with respect to the camera center. That is, in the camera reference frame. Together $T_t$, $R_t$ and $S_t$ define a bounding box 106 around the object 104 at time t. As will be appreciated, $T_t$, $R_t$ and $S_t$ are one way of parameterising the bounding box 106, but there are other ways of doing so.

Figure 2:
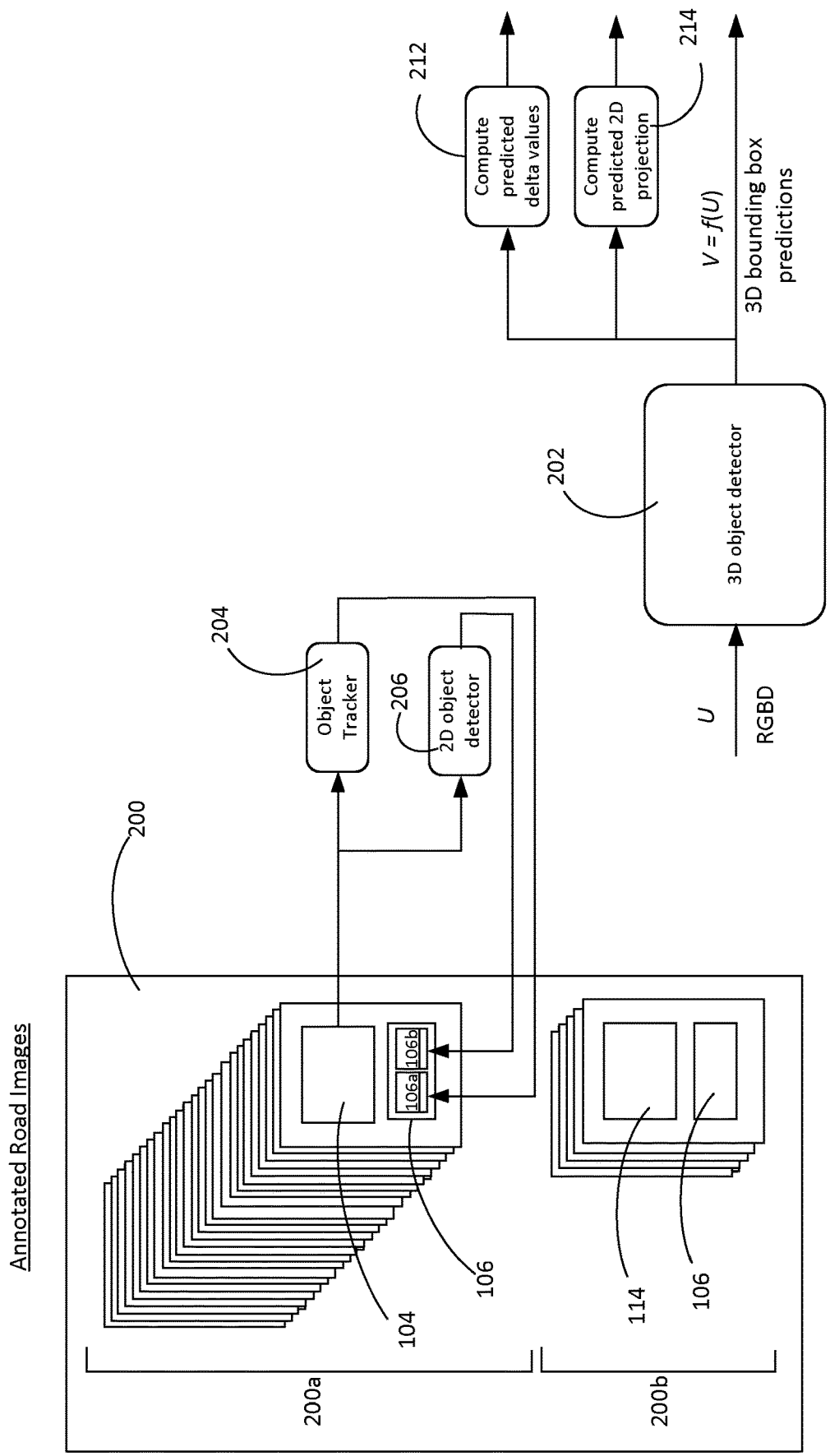
FIG. 2 shows a highly schematic function block diagram for a system for training a 3D structure detector.

FIG. 2 shows a highly schematic function block diagram of system for training a 3D object detector 202. At the hardware level, the system is embodied in a computer system as a computer program or a set of computer programs executed on execution hardware of the computer system. The execution hardware can for example comprise one or more processing units. A processing unit can for example be a CPU or accelerator (e.g. GPU). Alternatively or additionally, the execution hardware may comprise special-purpose hardware arranged to execute (part of) the model, such as an FPGA or ASIC. In addition to the 3D object detector 202, the system is shown comprise additional components 204, 206, 212 and 214 that are described later. These 3D object tracker 202 and the additional components 204-214 are functional components of the system, i.e. representing respectively functionality implemented by the computer program(s) when executed.

The ultimate purpose is to train the 3D object detector 202 to accurately detect and localize 3D objects in input RGBD images it has not encountered before, based on the visual and depth content (i.e. the RGBD values) of those images. The final output is a predicted 3D bounding box for each detected object. The 3D object detector is trained based on a large set of 3D training images 200. This is divided into two subsets: a small subset 200b of "fully" annotated images, and a larger subset 200a of 3D images that are only "simply" annotated. These images are extracted from RGBD video sequences (video images), and may be referred to as RGBD frames (frame images).

A 3D image in the large subset 200a is labelled 104 and has corresponding annotation data labelled 106. The annotation data 106 is "simple" annotation data in that it does not define 3D bounding boxes. The simple annotation data 106 comprises: (i) ground truth "delta" annotation data 106a, and (ii) ground truth 2D annotation data 106b defining one or more ground truth 2D bounding boxes in the image 104.

A 3D image in the small subset 200b is labelled 114 and has corresponding image annotation data labelled 116. The annotation data 116 is manually generated. It is "full" 3D annotation data in that it defines one or more ground truth 3D bounding boxes that tightly fit one or more 3D objects in the 3D image 114. Note, although not shown in FIG. 2, images in the small subset 200b may also have ground truth delta and/or 2D annotation data.

The ground truth delta annotation data 106a is described in detail later. For now, suffice it to say that the ground truth delta annotation data 106a associated with a given RGDB frame 104 denotes ground truth changes in the 3D position and orientation of any objects in that frame relative to another frame (e.g. the previous frame) in the RGBD video sequence from which it has been extracted (ground truth deltas values). These ground truth delta values are determined automatically using an object tracker 204. As noted, sufficiently accurate and robust object trackers exist today which can be used for this purpose, hence the details of object tracking are not described herein.

This is just one example of how ground truth delta values can be determined. As another example, expected position and orientation differences can be determined for a pair of images that have been captured by different image capture units (such as stereoscopic image capture units that simultaneously capture left/right stereoscopic images) based on a known geometric relationship between the image capture units. This may be known a priori or it may be estimated from the images themselves.

The 2D annotation data 106b can be generated by manual annotation of the RGB components images 104 in question. This is a significantly quicker and easier task than creating 3D annotations manually. Alternatively, as shown in FIG. 2, the 2D bounding boxes can be determined automatically by a 2D object detector 206, which applies 2D bounding box detection to each RGBD image 104. The 2D object detection can be applied to the RGB components (visual content) of each RGBD video frames 104, ignoring the depth component D and/or 2D object detection can be applied to the depth data D (e.g. where D is in the form of a depth map, this can be treated as a single colour channel image for the purpose of 2D object detection). Alternatively, 2D object detection could be applied to the RGBD image as a whole, treating it as an image with four colour channels. For other forms of structure representation (including those without RGB or other 2D image data), 2D image data can be applied to 2D image data derived therefrom, for example by performing a projection of the 3D structure representation into an image plane to create a e.g. depth map in the 2D image plane to which 2D object detection is applied. As noted, 2D bounding box detection is a mature technology, and there are many existing 2D bounding box detection technologies can be applied to this task and achieve the necessary level of accuracy. For this reason, the details of 2D bounding box detection are not described herein.

Note although in this example each image 104 in the larger set has both types of simple annotation data 106a, 106b, some of all of the images may have only one of these types of simple annotation data 106a, 106b.

The 3D object detector 202 has a CNN-based architecture in the following examples. Accordingly the 3D object detector 202 has a set of model parameters in a model architecture. During training, the 3D object detector 202 takes an input U which comprises visual data (RGB) and depth data (D) of an RGBD image and generates there from an output $V=f(U)$ where f is a function defined by the set of model parameters. In a CNN, the model parameters comprise weights between neurons (nodes) of the CNN as is known in the art.

3D object detection can be a staged process. For example, a 3D structure detector architecture is described below which has 2D object detection, image segmentation and finally 3D bounding box detection stages.

The 3D object detector 202 is trained based on the images in the training set 200 so as to match each output f(U) to the corresponding annotation data. In this case, the output f(U) denotes a predicted 3D bounding as determined based on the input U. Training is a recursive process, in which visual and depth data of the training images are systematically inputted to the 3D object detector 202, and the model parameters of the 3D object detector 202 are systematically adapted in an attempt to optimize a cost function that provides a measure of difference between the output f(U) and the corresponding annotation data for each of the training images (the cost or error). The aim of training is to minimize the cost function to the extent it can be minimized without overfitting. The training can be based on a computation of the gradient of the objective function with respect to the model parameters, e.g. using SGD in combination with backpropagation.

The cost function can be defined in relation to one or more loss functions. A loss function provides a measure of difference between the CNN output and the annotation data for an individual training input. A cost function aggregates the loss function over the set of training inputs, to provide an overall measure of difference.

For fully annotated RGBD images in the small subset 200b, it is the difference between the CNN output and the corresponding 3D bounding box annotation data 106b that contributes to the cost function, and the cost function penalizes differences therebetween.

For RGBD images in the large subset 200a that are only simply annotated, it is the difference between the CNN output and the corresponding simple annotation data 106 that contributes to the cost function, and the cost function penalizes differences therebetween.

In order to match the predicted 3D bounding box to the 2D ground truth bounding box data 106b, a projection computation component 214 geometrically projects the 3D bounding box predicted by the 3D object detector 202 into the image plane (x-y plane) of the RGBD image in question. That is, the geometric plane in which the RGB values are defined. This is also the plane in which the ground truth 2D bounding boxes are defined. The resulting projection is used to determine a predicted 2D bounding box, as described later.

As noted, the delta annotation data 106a defines ground truth delta values for the position and orientation of an object relative to another image in the set 200a in which the same object appears. In this context, as image pairs for which ground truth delta values are provided can be viewed as training inputs, and the objective is to (i) match the differences in the position and orientation of the predicted 3D bounding boxes to the corresponding ground truth delta values, and (ii) penalize changes in size (on the assumption that objects do not change size).

So that the position and orientation constraints can be applied, a change computation component 212 computes differences in 3D position and orientation ($\Delta T$, $\Delta R$) between the 3D bounding boxes predicted by the 3D object detector 202 for each 3D image pair under consideration (predicted delta values).

For size, the assumption is that the ground truth change in size is always zero. More generally, a size training constrain can be applied whenever the change in object size is known. For certain objects, the size may be expected to change (e.g. if a pedestrian raises their arm their height may change). Accordingly the size constraint may only be applied for certain classes of object that can be assumed to be rigid (such as card, buses etc.).

Although described in the context of RGBD images, the method can be applied to any 3D structure implementation. A 3D structure representation means a computer-readable representation of 3D structure, which includes for example 3D images, voxel-based or surface-based representations, point cloud data etc. A 3D image means an image comprising a plurality of pixels having associated depth information, such as RGBD images (Red Green Blue Depth), which may be frames of a video image having associated depth information.

In the approach described below, the training constrains are incorporated into a base 3D object detection architecture by way of auxiliary loss functions.

Auxiliary Loss Functions:

Two auxiliary loss functions are provided that enforce geometric constraints over predicted 3D bounding boxes in RGBD video data. The auxiliary loss functions provide a stronger supervisory signal and hence help the model learn a better feature space, which in turn leads to improved predictive accuracy during testing and use. To this end, the model takes as an input a pair of RGBD frames and the first auxiliary loss function ensures that the change in relative centre position, orientation and object size between two video frames are the same as ground truth relative changes. A second 3D-2D box constraint assumes that the 2D bounding box tightly covers the object of interest, and hence the second auxiliary loss function minimizes the distance between a projection of the predicted 3D box into the image plane and a corresponding ground truth 2D bounding box.

The depth information can be determined in any suitable manner, e.g. using stereoscopic imaging (where extractable depth information is captured in a stereoscopic pair of 2D images), LIDAR, time-of-flight imaging, or monocular processing (which allows depth information to be extracted from non-stereoscopic images, e.g. using monocular cues, as is known in the art) etc. The depth information can also be represented using any 3D spatial representation, such as a depth map, surface map, point cloud etc.

As will become apparent in view of the following, the auxiliary loss function can be incorporated into any existing 3D object detection architecture (referred to herein as the "base" architecture).

By way of example, in the following the known frustum point-net architecture (PointNet) is used as a base architecture. The PointNet architecture estimates 3D bounding boxes given inputs of a 2D detected object in a 2D image and an associated LiDAR point cloud. However, the description applied equally to other base 3D object detection architectures.

Consider bounding boxes at time t and t', which correspond the same object but are separated in time frame. Correspondence between objects across time can for example be established using the object tracker 204. That is, using object tracking that is applied independently of the 3D bounding box detection.

Losses are then defined that enforces geometric constraints on objects in a time sequence. Consider 3D objects at time t and t' to be represented by $(T_t, R_t, S_t)$ and $(T_{t'}, R_{t'}, S_{t'})$.

Training is formulated in a supervised fashion that enforces geometric constraints over the predicted 3D object detection from a RGBD video. The specific geometric constraints that are considered in the following example are: (i) a box consistency constraint and (ii) a box tightness constraint. These constraints ensure that the model learns to predict the correct pose with respect to camera 102 and extent of the object. An overall loss function is defined as follows:

$$L_{total} = L_b + \lambda_{cons} L_{cons} + \lambda_{corner} L_{corner}. \quad (1)$$

Here $L_b$, $L_{cons}$, $L_{corner}$ correspond to base architecture loss, consistency loss and corner losses respectively, and $\lambda_{cons}$, $\lambda_{corner}$ are corresponding hyper-parameters to weight the contribution of each loss function. These hyper-parameters are learned in training along with the model weights.

Consistency Loss.

Given 3D estimation for an object at time t and t', the consistency loss ensures that the change in relative center position, orientation and object size are same as the ground truth relative change. The goal is to minimize the distance between the predicted and ground truth relative changes of the object at time t and t'. One loss is defined for each of these object estimates: $L_{\Delta P}$, $L_{\Delta O}$, $L_{\Delta S}$ corresponding to change in position, orientation and size respectively.

Ground truth changes in position and orientation, denoted $\widetilde{\Delta T}$, $\widetilde{\Delta O}$ respectively are generated as follows:

$$\widetilde{\Delta T} = \tilde{T}_t - \tilde{T}_{t'} \quad (2)$$

$$\widetilde{\Delta \theta} = \tilde{\theta}_t - \tilde{\theta}_{t'} \quad (3)$$

Here, $\tilde{T}_t$ and $\tilde{\theta}_t$ are the object position and orientation at time t as determined by the object tracker 204; $\tilde{T}_{t'}$ and $\tilde{\theta}_{t'}$ are the position and orientation of the same object as determined by the object tracker 204 at time t'. Changes in the tracked position and orientation are used as ground truth values for training (rather than the tracked position and orientation directly) in order to minimize the error on the ground truth values. Errors build up in $\tilde{T}$ and $\tilde{\theta}$ over time, however the error on those changes over relatively small time intervals will be relatively small. Using delta values also means that the object tracker does not have to provide absolute object locations or orientations (i.e. 6D pose in the frame of reference in which 3D bounding box detection is performed). For example, the object tracker may track each object relative to an initial location and orientation of that object. Times t and t' can be the times of adjacent frames in an RGBD video, however this is not essential.

As noted, this is not limited to time-based tracking. For example, $\widetilde{\Delta T}$, $\widetilde{\Delta O}$ could be determined between a pair of stereoscopic images that were captured simultaneously, based on a known geometry of the stereoscopic image capture device that captured them.

During training, the effect of the consistency loss is to penalize deviations in the corresponding changes in the position and orientation of the corresponding predicted 3D bounding box:

$$\Delta T = T_t - T_{t'} \quad (4)$$

$$\Delta\theta = \theta_t - \theta_{t'} \quad (5)$$

Here, $T_t$ and $\theta_t$ are the object position and orientation at time t of the predicted 3D bounding box 106 determined for the object in question by the 3D object detector 202; $T_{t'}$ and $\theta_{t'}$ are the position and orientation of the 3D bounding box 106 determined for that object by the 3D object detector 202 at time t'. The effect of the position and orientation consistency losses $L_{\Delta P}$, $L_{\Delta O}$ is to penalize differences between $\widetilde{\Delta T}$ and $\Delta T$ and differences between $\widetilde{\Delta \theta}$ and $\Delta\theta$ respectively.

The ground truth for change in size $\Delta S$ is assumed to be (0,0,0) and the change in estimated size is:

$$\Delta S = (L_t - L_{t'}, H_t - H_{t'}, W_t - W_{t'}) \quad (6)$$

Where $L_t$, $H_t$, $W_t$ are the length, height and width of the predicted 3D bounding box 106 determined for the object at time t by the 3D object detector 202; $L_{t'}$, $H_{t'}$, $W_{t'}$ are the length height and width of the predicted 3D bounding box 106 for that object at time t'. The size consistency loss $L_{\Delta S}$ penalizes deviation in $\Delta S$ from the ground truth size change of zero.

The consistency loss $L_{cons}$ is a combination of change in center position, orientation and size loss:

$$L_{cons} = L_{\Delta P} + L_{\Delta O} + L_{\Delta S}.$$

The position consistency loss can for example take the following form, where a sum over N denotes a sum over all of the images in the training set 200:

$$L_{\Delta P} = \frac{1}{3N} \sum_N \sum_{i=x,y,z} L(\widetilde{\Delta T}_i - \Delta T_i) \quad (7)$$

A smooth L1 loss (i.e. absolute differences) is applied in this example, i.e.:

$$L(\widetilde{\Delta T}_i - \Delta T_i) = |\widetilde{\Delta T}_i - \Delta t_i|$$

Similarly the size loss takes the form of:

$$L_{\Delta S} = \frac{1}{N} \sum_N \frac{L(L_t - L_{t'}) + L(W_t - W_{t'}) + L(H_t - H_{t'})}{3} \quad (8)$$

Finally the loss on change in orientation takes the form as:

$$L_{\Delta\theta} = \frac{1}{N} \sum_N 2 - 2(\cos\widetilde{\Delta\theta}\cos\Delta\theta + \sin\widetilde{\Delta\theta}\sin\Delta\theta) \quad (9)$$

This loss is a representation of minimizing error between the estimate change $\Delta O$ and ground truth change $\widetilde{\Delta\theta}$ on a unit circle.

Corner Constraint.

The 3D-2D box constraint assumes that the 2D box tightly covers the object of interest such that the projection of the predicted 3D box in the image plane should completely overlap/fit the corresponding ground truth 2D box.

Figure 5:
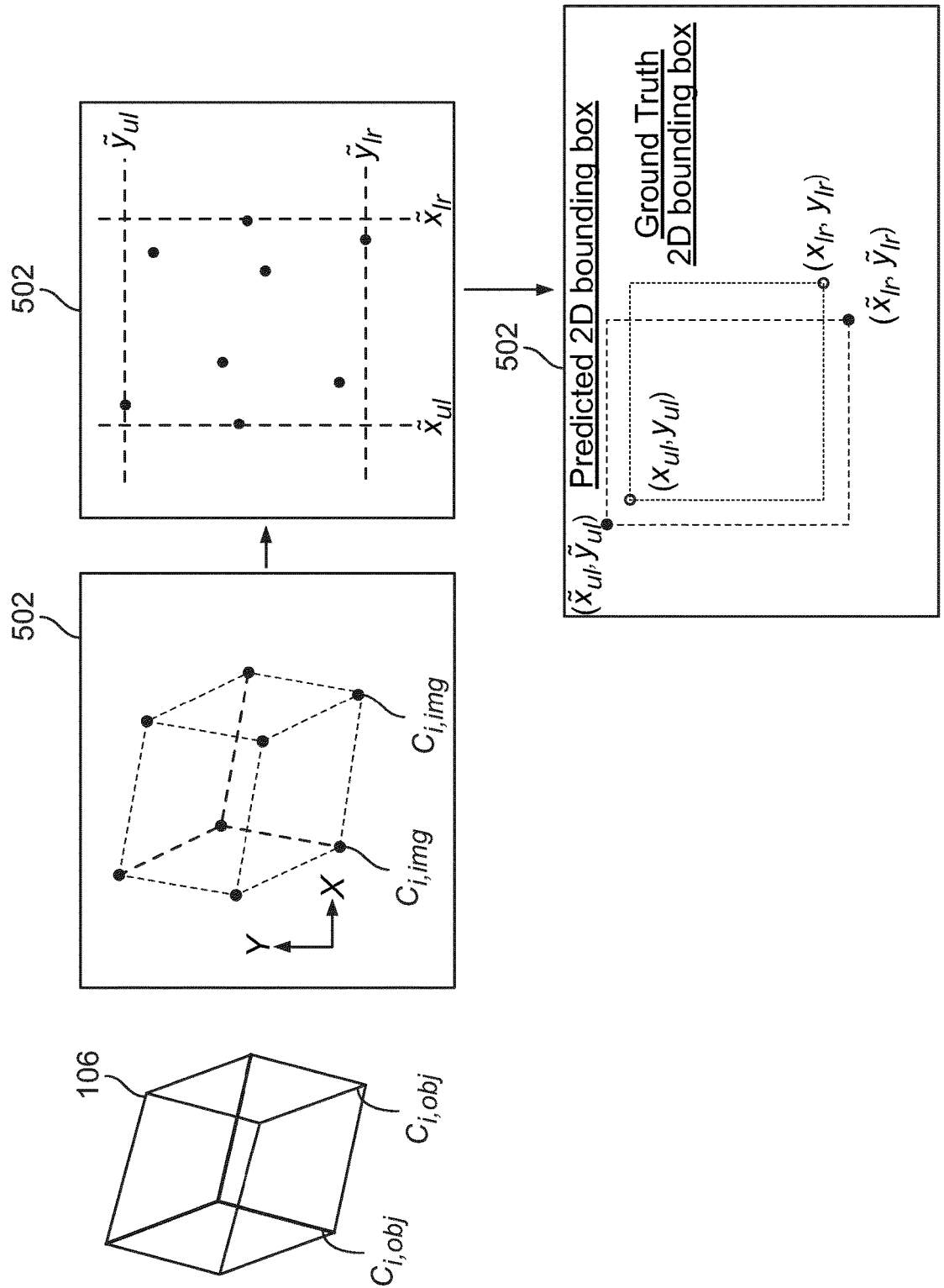
FIG. 5 illustrates a geometric projection of a predicted 3D bounding box into a 2D image plane to determine a predicted 2D bounding box for comparison with a 2D ground truth bounding box.

With reference to FIG. 5, in order to enforce such as a constraint, all eight corners of the predicted 3D box are projected into the image plane 502 to obtain a predicted 2D bounding box 504 for comparing with the corresponding ground truth 2D bounding box 506. The 2D corner loss then minimizes the distance between the predated and original 2D boxes.

In the object coordinate frame, the corner points $C_{i,obj}$ are projected to $C_{i,img} = (x_i, y_i)$ and are related by:

$$C_{i,img} = P_{proj}(T + RC_{i,obj}). \quad (10)$$

From these projected image points $C_{i,img}$, 2D box corner points are generated as:

$$\tilde{x}_{ul} = \min(x_i)_{i=0,\ldots,7}, \quad (11)$$

$$\tilde{y}_{ul} = \min(y_i)_{i=0,\ldots,7}, \quad (12)$$

$$\tilde{x}_{lr} = \max(x_i)_{i=0,\ldots,7}, \quad (13)$$

$$\tilde{y}_{lr} = \max(y_i)_{i=0,\ldots,7}, \quad (14)$$

These define the x-y coordinates of the upper left (ul) and lower right (lr) corner points of the predicted 2D bounding box 504, as $(\tilde{x}_{ul}, \tilde{y}_{ul})$ and $(\tilde{x}_{lr}, \tilde{y}_{lr})$, which can now be compared with the corresponding upper left and lower right corner points $(x_{ul}, y_{ul})$ and $(x_{lr}, y_{lr})$ of the ground truth 2D bounding box 506. The corner loss tries to minimize the distance between the predicted and original 2D boxes as:

$$L_{corner} = \frac{1}{N} \sum_N \sum_{i=lr,ul} L(\tilde{x}_i - x_i) \quad (15)$$

Base Loss.

The base architecture loss $L_b$ is a loss function of the base 3D object detection architecture into which the training constraints are being incorporated. It specifically provides a measure of difference between a predicted 3D bounding box and a corresponding 3D ground truth bounding box. For any images or which a ground truth 3D bounding box is not provided (which is the majority of images in the training set 200) $L_b$ is set to zero, and thus does not contribute to the overall cost function for such images.

In other words, the presented consistency and geometric losses can be incorporated along with losses defined on object center position, orientation and sizes. In recent time, several methods have been proposed that uses RGB-LiDAR data to estimate these values by directly optimizing for them in supervised learning setting. Examples include AVOD, FNet etc. As noted, this underlying object detection architecture is referred to as the base architecture and its corresponding loss is represented by $L_b$.

Implementation Details

Next, details of a suitable convolution network architecture, learning procedure and data generation steps are provided.

Example Architecture

Figure 3:
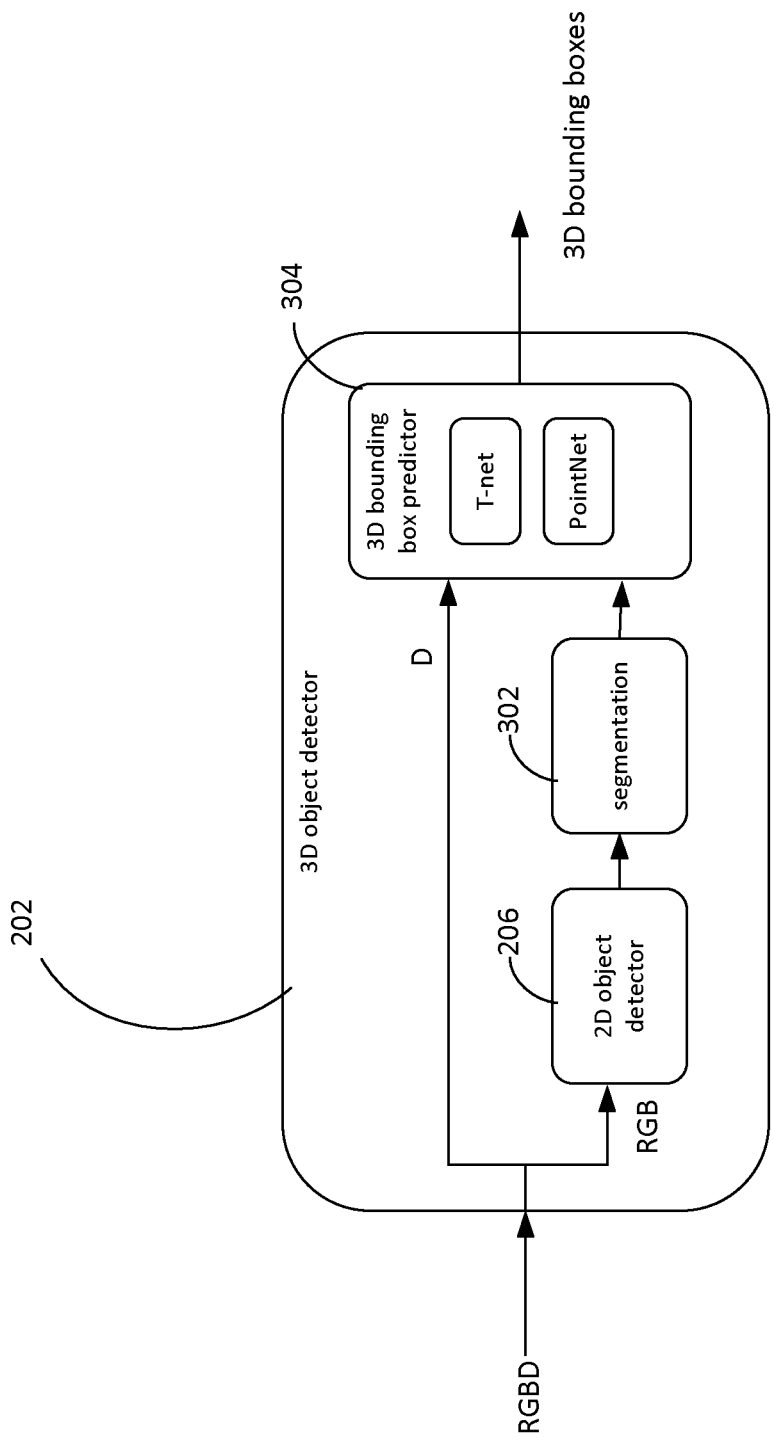
FIG. 3 shows a highly schematic function block diagram for an example 3D object detector architecture.

An example architecture for the 3D object detector 202 is shown in FIG. 3.

In order to leverage both the depth data and RGB information, a frustum-point based architecture is adopted. However it should be noted that the auxiliary losses are independent of the architecture and could be incorporated into any other neural network architecture.

The network 202 takes RGBD data as input and comprises two parallel sub-networks. The first subnetwork takes in depth data. In this case the depth data is point cloud data such as LiDAR data. The second sub-network takes RGB data as input and has three parts. The first part of the network leverages recent advancement in 2D object detector that proposes 2D regions of interest and their class labels. This first part is shown to comprise the 2D object detector 206. That is, in this example, the 2D object detector 206 that generates the 2D annotation data forms part of the 3D object detector 202.

These 2D regions and their labels are fed to an intermediate instance segmentation network 302 (second part) that separates object of interest regions from the background regions.

The final part of the network 304 is a 3D bounding box detector that takes in these segmented points and predicts an amodal 3D bounding box for the object (i.e. covering the whole of the object even if only part of it is visible). Given segmented points, amodal 3D box estimation consists of T-Net and 3D estimation both based on PointNet++ architecture. T-Net takes in segmented RGBD points and predicts center position of the box. This ensures the box roughly aligns with the points by translation to the ground box. The final part of the network utilizes the T-Net center points and predicts the final 3D amodal boxes. The amodal box prediction imposes three losses: position, orientation and size losses. In this manner, the architecture optimizes all these losses.

Learning:

Give a pair of frames at time t and t', the overall architecture involves optimizing for object center position, orientation, size, and the new losses consistency and corner losses. Further $$L_{t,t'} = L_{b,t} + L_{b,t'} + L_{cons} + L_{base} + L_{corner}. \quad (16)$$

Here $L_{b,t}$ takes the following form:

$$L_{t,t'} = L_{b,t} + L_{b,t'} + L_{cons} + L_{base} + L_{corner}. \quad (17)$$

The above can be implemented as part of a transfer learning process. In this context, the above steps are performed in a pre-training phase. After pre-training, the model can be fine-tuned to perform other useful task(s) in a fine-tuning (transfer learning) phase. In the fine-tuning phase, the model is fine-tuned to perform a different 3D structure interpretation task, other than 3D bounding box detection, but which can make use of the knowledge gained in learning 3D bounding box detection.

Component Parts

The described techniques can also be applied to component parts of a 3D object. In this context, the 3D object detector 202 is trained to detect the different component parts individually, for example by predicting a 3D bounding box for each component (component part) of interest. These could be vehicle components, body parts of a living being (human or animal), or a combination of both (e.g. in the case of cyclist or motorcyclist objects that comprise a human rider and a vehicle).

For example, in the case of a vehicle, there may be known geometric relationships between its component parts (e.g. its wheels, different parts of its body, lights, number plate, windows, doors, windscreen etc.). In this case, the component parts may be assumed to have a fixed relative position and orientation. This could be because the components are fixed or, in the case of moving components, the cost function may encode knowledge about how they move in relation to each other (e.g. the front wheels of a vehicle may rotate as the steering is changed, but may nevertheless be assumed to remain substantially parallel to each other on the assumption they are equally affected by changes in steering angle).

For a human or animal, similar relationships may be assumed between component body parts. These may not be fixed relative to each other, but there is still useful information about their relative geometric relationship than can be exploited in the cost function, e.g. knowledge of how different body parts are expected to move in relation to each other (e.g. different parts of the arm or leg, or the feet in relation to the leg), or of the points at which the arms or legs are expected to join the torso.

In this context, cyclists or motorcyclists and the like may be treated as a single object, and the cost function can exploit expected geometric relationships between the rider and the vehicle (e.g. treating them as separate components). For example, the cost function could encode the assumption that the rider is expected to remain above the body of the vehicle at more or less a fixed location.

In the case of component parts, it may be that what is ultimately still of interest is an accurate detection of the 3D object itself (not necessarily its components parts), e.g. an overall 3D bounding box for the whole object. Hence, the 3D object detector can still be trained to predict an overall 3D bounding box for the object, in addition to one or more other component parts (in this context, the 3D bounding box for the object as a whole is considered a component part, with one or more other component parts also being detected). In that case, the knowledge encoded in the cost function about the expected relationship between the component parts can still be informative to the 3D object detector 202, and result in better overall detections for the object as a whole once trained.

Another example of a relationship between component parts is that the 3D bounding box of the object as a whole contains the 3D bounding box(es) of the other component part(s).

As above, deviation from the expected geometric relationship between component parts is not prohibited. Rather, such deviation is "softly" penalized in training by way of a cost penalty, reducing the reliance on human annotations in the same way as described above.

Use Case—Autonomous Driving

An autonomous vehicle, also known as a self-driving vehicle, refers to a vehicle which has a sensor system for monitoring its external environment and a control system that is capable of making and implementing driving decisions autonomously using those sensors. This includes in particular the ability to automatically adapt the vehicle's speed and direction of travel based on inputs from the sensor system. A fully autonomous or "driverless" vehicle has sufficient decision making capability to operate without any input from a human driver. However the term autonomous vehicle as used herein also applies to semi-autonomous vehicles, which have more limited autonomous decision-making capability and therefore still require a degree of oversight from a human driver.

Figure 4:
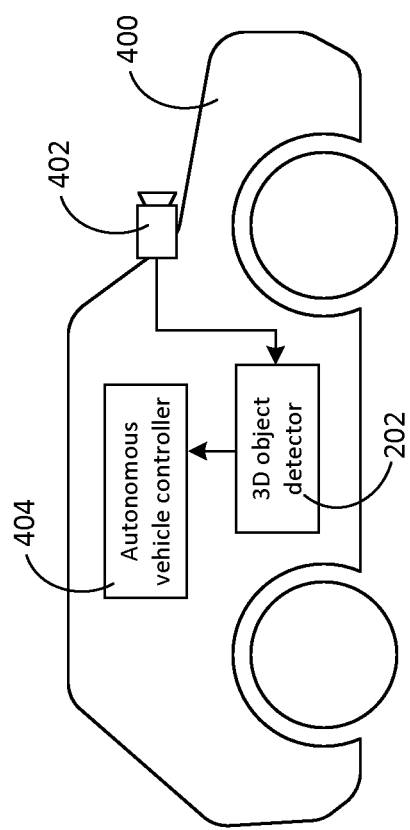
FIG. 4 shows a highly schematic function block diagram of an autonomous vehicle (AV)

FIG. 4 shows a highly-schematic block diagram of an autonomous vehicle 400, which is shown to comprise an instance of the 3D object detector 202, having an input connected to an image capture device 402 of the vehicle 400 and an output connected to an autonomous vehicle controller 404. In use, the 3D object detector 202 of the autonomous vehicle 400 applies 3D object detection as described above to 3D images captured by the image capture device 402, in real time, in accordance with its training, and the autonomous vehicle controller 404 controls the speed and direction of the vehicle based on the results, with no or limited input from any human. The 3D object detection is performed in a frame of reference of the image capture device 402. The vehicle 400 is a car in this example, but it can be any form of vehicle.

The CNN 202 and autonomous vehicle controller 404 are functional components of the autonomous vehicle 400 that represent certain high-level functions implemented within the autonomous vehicle 400. These components can be implemented in hardware or software, or a combination of both. For a software implementation, the functions in question are implemented by one or more processors of the autonomous vehicle 100 (not shown), which can be general-purpose processing units such as CPUs and/or special purpose processing units such as GPUs. Machine-readable instructions held in memory cause those functions to be implemented when executed on the one or more processors. For a hardware implementation, the functions in question can be implemented using special-purpose hardware such as application-specific integrated circuits (ASICs) and/or field programmable gate arrays (FPGAs).

A further aspect herein provides a method of training a 3D structure detector to detect 3D structure in 3D structure representations, the method comprising the following steps: receiving, at a trainable 3D structure detector, a set of training inputs, each training input comprising at least two 3D structure representations; the 3D structure detector determining, for each training input, a set of predicted 3D boundary objects for a common 3D structural element detected in the 3D structure representations of that training input; and training the 3D structure detector to optimize a cost function, wherein the cost function penalizes deviation from an expected geometric relationship between the set of predicted 3D boundary objects determined for each training input.

In embodiments, the method may comprise a step of determining, for each of at least some of the training inputs, a size difference between the set of predicted 3D boundary objects, wherein the cost function penalizes any deviation in the determined size difference from an expected size difference for each of those training inputs.

For example, the expected size difference may be zero.

At least some of the 3D structure representations may be selected from at least one temporal sequence structure representations.

Object tracking may be applied, by an object tracker, to the at least one temporal sequence of structure representations, wherein the expected geometric relationship may be determined for each of said at least some of the training inputs based on tracking of the common 3D structural element by the object tracker.

The method may comprise a step of determining, for each of at least some of the training inputs, a position difference between the set of predicted 3D boundary objects, wherein the cost function penalizes any deviation in the determined position difference from an expected position difference.

For example, the above expected position difference may be determined based on the tracking of the common 3D structural element by the object tracker.

The method may comprise a step of determining, for each of at least some of the training inputs, an orientation difference between the set of predicted 3D boundary objects, wherein the cost function may penalize any deviation in the determined orientation difference from an expected orientation difference.

For example, the above expected orientation difference may be determined based on the tracking of the common 3D structural element by the object tracker.

The at least one temporal sequence of structure representations may be a sequence of images comprised in at least one video image.

The 3D structure representations of each of at least some of the training inputs may have been captured by different sensor units, wherein the expected geometric relationship between the predicted 3D boundary objects may be determined based on a known geometric relationship between the different sensor units.

For example, the known geometric relationship may be determined by processing data captured by the different sensor units.

A subset of the 3D structure representations may have associated ground truth 3D boundary object annotation data, and the cost function may also penalize deviations between the ground truth 3D boundary object annotation data and the predicted 3D boundary objects determined for those 3D structure representations by the 3D object detector.

The 3D boundary objects may be 3D bounding boxes.

For example, the 3D bounding boxes may be amodal.

At least some 3D structure representations received at the 3D structure detector may have associated 2D structure annotation data, and the cost function may also penalize deviation between a predicted 2D boundary object determined for each of those 3D structure representations and the associated 2D structure annotation data, wherein the predicted 2D boundary object may be determined by projecting the predicted 3D boundary object determined for that 3D structure representations into a 2D image plane.

A further aspect herein provides a method of training a 3D structure detector to detect 3D structure in 3D structure representations, the method comprising the following steps: receiving, at a trainable 3D structure detector, training inputs comprising 3D structure representations; the 3D structure detector determining, for each training 3D structure representation, a predicted 3D boundary object for a 3D structural element detected in that training 3D structure representation; determining for each 3D structure representation a predicted 2D boundary object, by projecting the predicted 3D boundary object into a 2D image plane; and training the 3D structure detector to optimize a cost function, wherein each 3D structure representation has associated 2D structure annotation data for marking 2D structure in the 2D image plane, and the cost function penalizes deviation between the predicted 2D boundary object and the 2D structure annotation data.

At least some of the 2D structure annotation data may be manually determined.

At least some of the 2D structure annotation data may be determined automatically by applying 2D object detection to 2D image data of or derived from the 3D structure representations.

The predicted 3D boundary object may be a 3D bounding box, and the 2D annotation data may define a ground truth 2D bounding box in the image plane for each 3D structure representation.

The predicted 2D boundary object may be a predicted 2D bounding box determined by projecting the corners points of the 3D bounding box into the image plane, and determining therefrom at least two corner points for the predicted 2D bounding box, wherein the cost function may penalize differences in the distance between those corner points and corresponding corner points of the ground truth 2D bounding box.

A further aspect herein provides an executable 3D object detector which is embodied in a computer readable storage medium and which has been trained in accordance with the any of the training methods taught herein.

A further aspect provides an image processing system comprising execution hardware configured to execute the 3D object detector in order to detect 3D structure in received 3D structure representations.

A further aspect provides autonomous vehicle comprising: at least one 3D image capture device; the above image processing system, coupled to the image capture device for detecting 3D structure in 3D images captured thereby; and a control system configured to control the operation of the autonomous vehicle based on 3D structure detected by the image processing system.

A computer system may comprise execution hardware which is configured to execute the method/algorithmic steps disclosed herein. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Exampled of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

It will be appreciated that, whilst specific embodiments of the invention have been described, these are not exhaustive. The scope of the invention is not defined by the described embodiments but only by the appendant claims.

The invention claimed is:

1. A method of training a 3D structure detector to detect 3D structure in 3D structure representation, the method comprising the following steps:
receiving, at a trainable 3D structure detector, a set of training inputs, each training input comprising at least one 3D structure representation;
the 3D structure detector determining, for each training input, a set of predicted 3D objects for the at least one 3D structure representation of that training input; and
training the 3D structure detector to optimize a cost function, wherein the cost function penalizes deviation from an expected geometric relationship between the set of predicted 3D objects for the at least one 3D structure representation, determined for each training input.

2. The method of claim 1, wherein each training input comprises at least two 3D structure representations, wherein the set of predicted 3D objects are predicted 3D objects for a common 3D structural element captured in the 3D structure representations of that training input.

3. A method according to claim 2, wherein one or more of the 3D structure representations are selected from at least one temporal sequence of structure representations, the 3D objects corresponding to the common 3D structural element at different times.

4. A method according to claim 3, wherein object tracking is applied, by an object tracker, to the at least one temporal sequence of structure representations, wherein the expected geometric relationship is determined for each of one or more of the training inputs based on tracking of the common 3D structural element by the object tracker.

5. A method according to claim 3, wherein the at least one temporal sequence of structure representations is a sequence of images comprised in at least one video image.

6. A method according to claim 2, wherein at least one of the training inputs comprises at least two 3D structure representations captured by different sensor units, wherein the expected geometric relationship between the predicted 3D objects is determined based on a known geometric relationship between the different sensor units, the predicted 3D objects corresponding to the common 3D structural element captured from the different sensor units.

7. A method according to claim 6, wherein the known geometric relationship is determined by processing data captured by the different sensor units.

8. A method according to claim 1, wherein the set of predicted 3D objects are predicted 3D objects for component parts of a 3D object captured in the at least one 3D structure representation, the cost function penalizing deviation from an expected geometric relationship between the component parts.

9. A method according to claim 1, comprising a step of determining, for each of one or more of the training inputs, a size difference between the set of predicted 3D objects, wherein the cost function penalizes any deviation in the determined size difference from an expected size difference for each of the one or more training inputs.

10. A method according to claim 9, wherein each training input comprises at least two 3D structure representations, wherein the set of predicted 3D objects are predicted 3D objects for a common 3D structural element captured in the 3D structure representations of that training input, and wherein the expected size difference is zero.

11. A method according to claim 1, comprising a step of determining, for each of one or more of the training inputs, a position difference between the set of predicted 3D objects, wherein the cost function penalizes any deviation in the determined position difference from an expected position difference.

12. A method according to claim 4, comprising a step of determining, for each of one or more of the training inputs, a position difference between the set of predicted 3D objects, wherein the cost function penalizes any deviation in the determined position difference from an expected position difference, wherein the expected position difference is determined based on the tracking of the common 3D structural element by the object tracker.

13. A method according to claim 1, comprising a step of determining, for each of one or more of the training inputs, an orientation difference between the set of predicted 3D objects, wherein the cost function penalizes any deviation in the determined orientation difference from an expected orientation difference.

14. A method according to claim 4, comprising a step of determining, for each of at least some of the training inputs, an orientation difference between the set of predicted 3D objects, wherein the cost function penalizes any deviation in the determined orientation difference from an expected orientation difference, wherein the expected orientation difference is determined based on the tracking of the common 3D structural element by the object tracker.

15. A method according to claim 8, wherein the captured 3D object comprises a vehicle and the component parts comprise vehicle components; or
   wherein the captured 3D object comprises a living being, and the component parts comprise body parts; or
   wherein the captured 3D object comprises both a living being and a vehicle, and the component parts comprise one or more body parts and one or more vehicle components.

16. A method according to claim 1, wherein a subset of the 3D structure representations have associated ground truth 3D object annotation data, and the cost function also penalizes deviations between the ground truth 3D object annotation data and the predicted 3D objects determined for those 3D structure representations by the 3D object detector.

17. A method according to claim 1, wherein each 3D object is represented as a 3D boundary object.

18. A method according to claim 17, wherein the at least one 3D structure representation received at the 3D structure detector have associated 2D structure annotation data, and the cost function also penalizes deviation between a predicted 2D boundary object determined for each of those 3D structure representations and the associated 2D structure annotation data, wherein the predicted 2D boundary object is determined by projecting the predicted 3D boundary object determined for that 3D structure representations into a 2D image plane.

19. Non-transitory media embodying a 3D object detector as a set of executable program instructions, the 3D object detector having been trained by:
   receiving, at the 3D object detector, a set of training inputs, each training input comprising at least one 3D structure representation:
   the 3D object detector determining, for each training input, a set of predicted 3D objects for the at least one 3D structure representation of that training input; and
   training the 3D object detector to optimize a cost function, wherein the cost function penalizes deviation from an expected geometric relationship between the set of predicted 3D objects for the at least one 3D structure representation determined for each training input.

20. A processing system comprising: execution hardware configured to train a 3D structure detector to detect 3D structure in 3D structure representation, by:
   receiving, at the 3D structure detector, a set of training inputs, each training input comprising at least one 3D structure representation:
   the 3D structure detector determining, for each training input, a set of predicted 3D objects for the at least one 3D structure representation of that training input: and
   training the 3D structure detector to optimize a cost function, wherein the cost function penalizes deviation from an expected geometric relationship between the set of predicted 3D objects for the at least one 3D structure representation determined for each training input.

* * * * *